C. L. AVERY.
OILER FOR CRANK PINS.
APPLICATION FILED JUNE 23, 1916.
1,212,602. Patented Jan. 16, 1917.
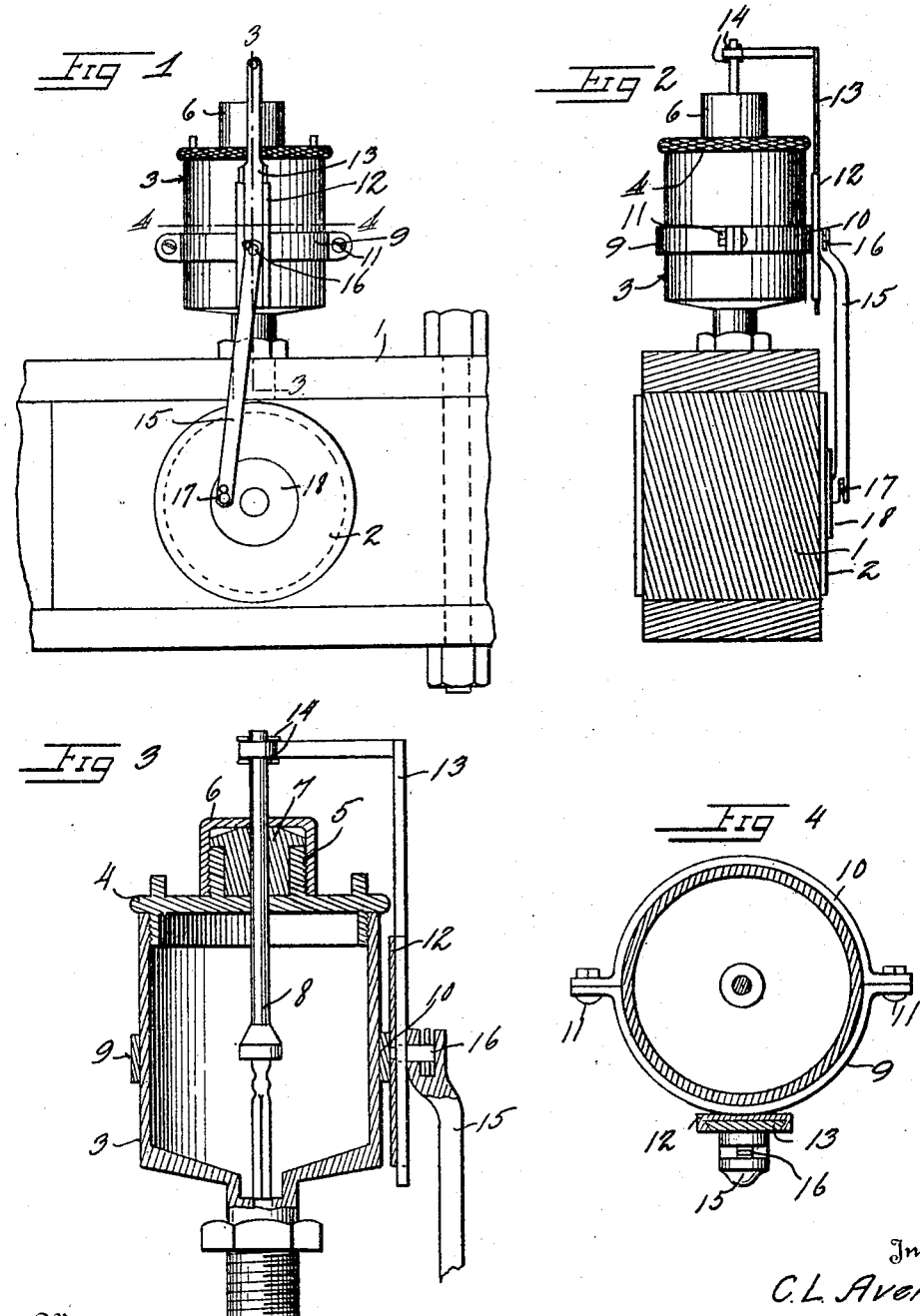
Witnesses
Inventor
C. L. Avery
By
Attorneys

UNITED STATES PATENT OFFICE.

CLAYTON L. AVERY, OF TECUMSEH, MICHIGAN.

OILER FOR CRANK-PINS.

1,212,602.      Specification of Letters Patent.      Patented Jan. 16, 1917.

Application filed June 23, 1916. Serial No. 105,469.

*To all whom it may concern:*

Be it known that I, CLAYTON L. AVERY, a citizen of the United States, residing at Tecumseh, in the county of Lenawee, State of Michigan, have invented certain new and useful Improvements in Oilers for Crank-Pins of Engine Connecting-Rods; and I do hereby declare the following to be a full, clear, and exact description of the invention, such as will enable others skilled in the art to which it appertains to make and use the same.

This invention relates to an oiler for the crank pin of an engine connecting rod.

An object of the invention resides in the provision of a device by means of which the crank pin will be automatically oiled during the operation of the connecting rod.

A further object of the invention resides in so constructing the device that the oil will be fed to the crank pin in proportion to the speed of the connecting rod and upon each revolution of the crank pin.

With these and other objects in view, such as will appear as my description progresses, my invention comprises the combination and arrangement of parts as set forth in and falling within the scope of the appended claims.

In the drawing: Figure 1 is an elevational view of my device showing the same applied to a crank arm and pin; Fig. 2 is a similar view looking at right angles to Fig. 1; Fig. 3 is a vertical sectional view on line 3—3 of Fig. 1, and Fig. 4 is a horizontal sectional view on line 4—4 of Fig. 1.

In the drawing I have illustrated a connecting rod 1 which is mounted on the usual pin 2. A grease cup 3 is mounted on the connecting rod and communicates with the pin 2 through an opening in the rod. This cup comprises a container on the upper end of which a cover 4 is mounted, which cover is provided with a packing box 5 on which a cap 6 is mounted and in which a sleeve 7 is disposed. A feeder pin 8 is located within the grease cup and extends upwardly through the sleeve 7. This pin is adapted to reciprocate in the cup so as to feed the hard oil or grease from the opening to the pin 2. In order that this grease may be fed upon each revolution of the pin, I have provided a pair of clamping members 9 and 10 which encircle the oil cup and are secured together by bolts 11. The clamping member 9 is provided with a vertical guide 12 in which an arm 13 is slidably mounted. This arm extends upwardly and above the cover of the cup and is secured thereto by a pair of cotter pins 14. A connecting rod 15 is pivotally secured, at 16, to this arm 13 and extends downwardly therefrom. This rod 15 is secured, at 17, to a disk 18, which disk is mounted on the pin 2. The point of connection 17 is eccentric to the center of the pin 2 and the disk 18.

Now in operation the arm 13 will be reciprocated as the pin 2 rotates, by virtue of its connection with the disk 18 through the rod 15. The pin 8 will therefore be given a downward or feeding movement once upon each revolution of the pin 2 and this feeding movement will result in the forcing of hard oil or grease to the pin 2.

It will therefore be seen that I have provided an oiling device by means of which the hard oil or grease will be fed to the wrist pin of a connecting rod once upon each revolution of the pin and I have so constructed the device that the feeder pin will assume its normal or initial position before each feeding operation.

While I have illustrated and described a particular embodiment of my invention it has merely been for the sake of convenience and I do not wish to be limited to that particular embodiment as it is obvious that numerous changes may be made in the details of construction without departing from the spirit of the invention or exceeding the scope of the appended claims.

What I claim is:—

1. The combination with a connecting rod and its wrist pin, of an oil cup mounted on the connecting rod and having communication with the wrist pin, a feeder pin mounted in the cup for reciprocating movement, a clamp secured to the cup and having a vertically extending guide thereon, an arm slidably mounted in said guide and adapted to reciprocate vertically, said arm being connected to the upper end of the feeder pin, a disk secured to the wrist pin and a connecting rod secured, pivotally, to the lower end of the aforementioned arm and to the aforementioned disk and eccentrically of the latter.

2. The combination with a rod and its wrist pin, of an oil cup mounted on the connecting rod and communicating with the wrist pin, a feeder pin mounted in the oil cup for reciprocating movement, a guide mounted on the outer side of the cup, an arm slidably mounted in the guide and having connection to the upper end of the feeder pin, a disk secured to the wrist pin and means connected to the lower end of the aforementioned arm and to the disk eccentrically of the latter to reciprocate the arm upon the movement of the disk.

In testimony whereof, I affix my signature, in the presence of two witnesses.

CLAYTON L. AVERY.

Witnesses:
GUY E. NEMIRE,
J. H. SMITH.

Copies of this patent may be obtained for five cents each, by addressing the "Commissioner of Patents, Washington, D. C."